United States Patent [19]
Kilgore et al.

[11] Patent Number: 5,598,521
[45] Date of Patent: Jan. 28, 1997

[54] DIRECTLY CONNECTED DISPLAY OF PROCESS CONTROL SYSTEM IN AN OPEN SYSTEMS WINDOWS ENVIRONMENT

[75] Inventors: William B. Kilgore; William S. Cochell, both of Phoenix, Ariz.

[73] Assignee: Honeywell Inc., Minneapolis, Minn.

[21] Appl. No.: 427,645

[22] Filed: Apr. 24, 1995

Related U.S. Application Data

[63] Continuation of Ser. No. 899,199, Jun. 16, 1992, abandoned.

[51] Int. Cl.$^6$ .................................................. G06F 3/00
[52] U.S. Cl. ............................................ 395/326; 395/340
[58] Field of Search ................................. 395/155–161, 395/162–166, 200, 275, 325, 425; 345/117–120; 340/825.52

[56] References Cited

U.S. PATENT DOCUMENTS

| | | | |
|---|---|---|---|
| 4,607,256 | 8/1986 | Henzel | 340/825.52 |
| 4,709,347 | 11/1987 | Kirk | 395/200 |
| 5,226,118 | 7/1993 | Baker et al. | 395/161 |
| 5,295,244 | 3/1994 | Dev et al. | 395/161 |
| 5,297,252 | 3/1994 | Becker | 395/160 |

OTHER PUBLICATIONS

Martin, "Local Area Networks", Martin, 1989, pp. 163–183.
Scheifler et al, "X Window System", MIT and DEC, 1988, pp. 1–117, 166–173, 280–297, 306–307, 352–355, 420–429.
Jones, "Introduction to the X Window System", MIT and DEC, 1988, pp. 27–64.
Treadway, "Working with Windows", Computer Graphics World, Sep. 1988, pp. 79–86.
Dolan et al., "X Window System Servers in Embedded Systems", COMPCON, Mar. 1990, pp. 314–319.
Lucas et al, "Modern Operators'Consoles for Accelerator—Control at Femilab", IEEE PAC, May 1991, pp. 2523–2525.
Sung et al, "A Critical Evaluation of PEX", IEEE Comp. Graphics and Appl., Nov. 1990, pp. 65–75.
Johnson et al, "Controlling Colors the Xlib Way", Computer Language, Jul. 1990, p. 34 (11).
Rosenthal, "Window Exchange", Unix Review, Dec. 1989, pp. 59(5).

*Primary Examiner*—Mark R. Powell
*Assistant Examiner*—John E. Breene
*Attorney, Agent, or Firm*—Arthur A. Sapelli

[57] ABSTRACT

In a display for a process control system, the display can be generated by one of two different sources, but is controlled by only one of them. A process control system network provides a first source of display, while a windowing system provides a second source. The control system network provides crucial information to the display regarding the operation of the process control system. Alternatively, the windowing system allows displays to be generated from a variety of sources including external computer systems. The windowing system controls the display by opening and maintaining windows. One specific window to be opened is a window in which the control system network can display information. To allow the control system network to communicate information, a window is opened by the windowing system, and then the process control network is allowed to overwrite information into this newly opened window. Also, should the windowing system fail, control of the display is given to the control system network.

4 Claims, 4 Drawing Sheets

DIRECTLY CONNECTED DISPLAY OF PROCESS CONTROL SYSTEM IN AN OPEN SYSTEMS WINDOWS ENVIRONMENT

This is a continuation of application Ser. No. 07/899,199 filed on Jun. 16, 1992, now abandoned.

RELATED APPLICATIONS

The present application is related to the following:

a) patent application, Ser. No. 07/899,198, entitled "An Open Distributed Digital System" by K. Staggs et al;

b) patent application, Ser. No. 07/899,441, entitled "A Method for Controlling Window Displays in an Open System Windows Environment", by K. Staggs et al;

c) patent application, Ser. No. 07/899,440, entitled "Priority Based Graphics for an Open Systems Windows Environment", by W. B. Kilgore et al;

d) patent application, Ser. No. 07/899,197, entitled "Device Dependent Layer of a Windowing System for a Process Control System", by W. B. Kilgore et al;

e) patent application, Ser. No. 07/889,442, entitled "A Method of Coupling Open Systems to a Proprietary Network", by D. Phillips et al;

all of the above filed on even date herewith, and all of the above assigned to Honeywell Inc., the assignee of the present application.

BACKGROUND OF THE INVENTION

The present invention deals with the display of information on a display screen. More specifically, the present invention provides an apparatus for displaying information regarding the operation and status of a process control system, while also allowing the display system to operate in a windows environment.

In a process control environment it is necessary for a process control system to display large amounts of information to control system operators. Much of the information communicated to the operators is of a crucial nature and it is very important that this information be displayed correctly and in a manner which the system operators will recognize. Typically, most information is communicated to the operators via a cathode ray tube (CRT) or display screen of equivalent type.

Much of the information communicated is very critical to the proper operation of the control system. Additionally, information is necessary to maintain safe operation of the control system. A failure of the display system could cause a malfunction which in turn could be very dangerous to the process control system. For example, in a oil refinery certain warning information must be displayed to the operators to avoid explosion and/or catastrophe. Therefore, it is important that this crucial information be communicated to the system operator in an accurate fashion and that the information maintain its integrity.

SUMMARY OF THE INVENTION

In order to enhance the capabilities of modern day process control systems, the display of the process control system has been upgraded to include windowing capabilities. These windowing capabilities allow numerous windows to be displayed on the screen simultaneously. Generally, windowing capabilities can allow certain display screens to be exported to other computer systems and can further allow certain display screens to be imported from other computer systems. The present invention allows many displays to be imported while also allowing some displays to be exported. This open communication of displays provides for a much more flexible and efficient process control system.

In order to maintain the integrity of the process control system display, the windowing system must also be capable of displaying crucial systems information without destroying the integrity of such information. In the present invention the control system is directly connected to display generator, in addition to the windowing system being connected to the same display generator. The direct connection between the control system and the display generator allows the process control system to display its crucial information to the operator via a direct connection. Therefore, when crucial information is communicated to the system display such information does not have to go through the windowing system.

The maintenance of two sources of graphic display creates a problem when trying to manage the display capabilities of the process control system. This problem is solved by allowing the windowing system to manage the display (a cathode ray tube or CRT) while also allowing the control system to display information within a portion of the display. In operation the windowing system allocates "real estate" on the system display (an LCN window) in which the process control system can display information related to the operation of the process control system. (Information to be displayed by the process control system is transmitted to the display via the Local Control Network (LCN), thus this information, when displayed on the CRT, is referred to as the LCN display). The windowing system sets the size and location of the LCN window and enables its drawing capabilities. Furthermore, the windowing system allows the operator to zoom in on the LCN window and to scroll within the LCN window if so desired.

It is an object of the present invention to provide a display system with windowing capabilities which also allows a directly connected network display. The network display and windowing system both communicate with a display generator which eventually projects the display onto the screen (a cathode ray tube or CRT).

BRIEF DESCRIPTION OF THE DRAWINGS

Other objects, features, and advantages of the invention would be apparent from the following detailed description taken in conjunction with the accompanying drawings in which.

DETAILED DESCRIPTION OF THE INVENTION

Figure 1:
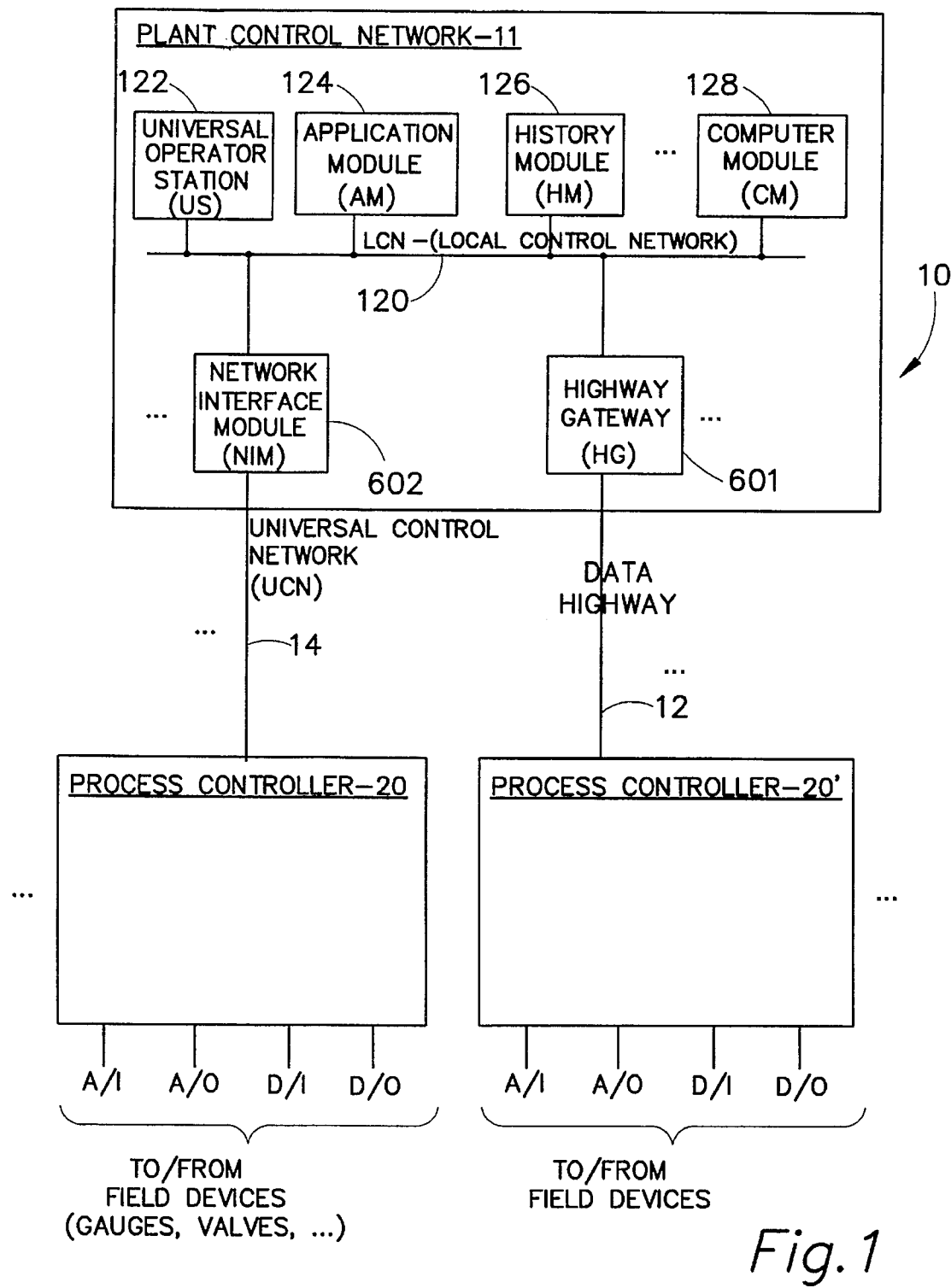
FIG. 1 is a block diagram showing a process control system having at least one display.

Before describing the present invention, it will be helpful to understand the system environment in which the invention is utilized. Referring to FIG. 1, there is shown a block diagram of a process control system 10 of the preferred embodiment in which the present invention can be found. Process control system 10 includes a plant control network 11, and connected thereto is a data highway 12, which permits a process controller 20' to be connected thereto. In the present day process control system 10, additional process controllers 20' can be operatively connected to the plant control network 11 via a corresponding highway gateway 601 and a corresponding data highway 12. A process controller 20, an interface apparatus which includes many new, additions, improvements, and features over the process controller 20', is operatively connected to the pant control network 11 via a universal control network (UCN) 14 to a network interface module (NIM) 602. In the preferred embodiment of process control system 10, additional process controllers 20 can be operatively connected to plant control network 11 via a corresponding UCN 14 and a corresponding NIM 602. The process controllers 20, 20' interface the analog input and output signals, and digital input and output signals (A/I, A/O, D/I, and D/O respectively) to process control system 10 from the variety of field devices (not shown) of the process being controlled which includes valves, pressure switches, pressure gauges, thermocouples.

Plant control network (or more simply network) 11 provides the overall supervision of the controlled process, in conjunction with the plant operator, and obtains all the information needed to perform the supervisory function, and includes an interface with the operator. Plant control network 11 includes a plurality of physical modules, which include a universal operator station (US) 122, an application module (AM) 124, a history module (HM) 126, a computer module (CM) 128, and duplicates (backup or secondary) of these modules (and additional types of modules, not shown) as necessary to perform the required control/supervisory function of the process being controlled. Each of these physical modules is operatively connected to a local control network (LCN) 120 which permits each of these modules to communicate with each other as necessary. The NIM 602 and HG 601 provide an interface between LCN 120 and UCN 14, and LCN 120 and data highway 12, respectively.

Physical modules 122, 124, 126, 128, . . . of network 11 of the preferred embodiment are of various specialized functional types. Each physical module is the peer, or equivalent, of the other in terms of right of access to the network's communication medium, or LCN 120, for the purpose of transmitting data to other physical modules of network 11.

Universal operator station module (US) 122 of network 11 is a work station for one or more plant operators. It includes an operator console which is the interface between the plant operator, or operators, and the process or processes of the plant for which they are responsible. Each universal operator station module 122, is connected to LCN 120, and all communications between universal operator station module 122, and any other physical module of network 11, is via the LCN 120. Universal operator station module 122 has access to data that is on LCN 120 and the resources and data available through, or from, any of the other physical modules of network 11. Universal station module 122 includes a cathode ray tube display (CRT) (not shown) which includes a video display generator, an operator keyboard (KB) (not shown), a printer (PRT) (not shown), and can also include (but not shown) a floppy disk data storage device, trend pen recorders, and status displays, for example.

A history module (HM) 126 provides mass data storage capability. History module 126 includes at least one conventional disk mass storage device such as a Winchester disk, which disk storage device provides a large volume of programs in higher level program languages. Typically, the data processing systems of a computer module 128 have the capability of communicating with other such systems by a communication processor and communication lines.

Local control network 120 (LCN) is a high-speed, bit serial, dual redundant communication network that interconnects all the physical modules of plant control network 11. LCN 120 provides the only data transfer path between the principal sources of data, such as highway gateway module 601, application module 124, and history module 126, and principal users of such data, such as universal operator station module 122, computer module 128, and application module 124. LCN 120 also provides the communication medium over which large blocks of data, such as memory images, can be moved from one physical module such as history module 126 to universal station module 122. LCN 120 is dual redundant in that it consists of two coaxial cables that permit the serial transmission of binary signals over both cables.

Figure 2:
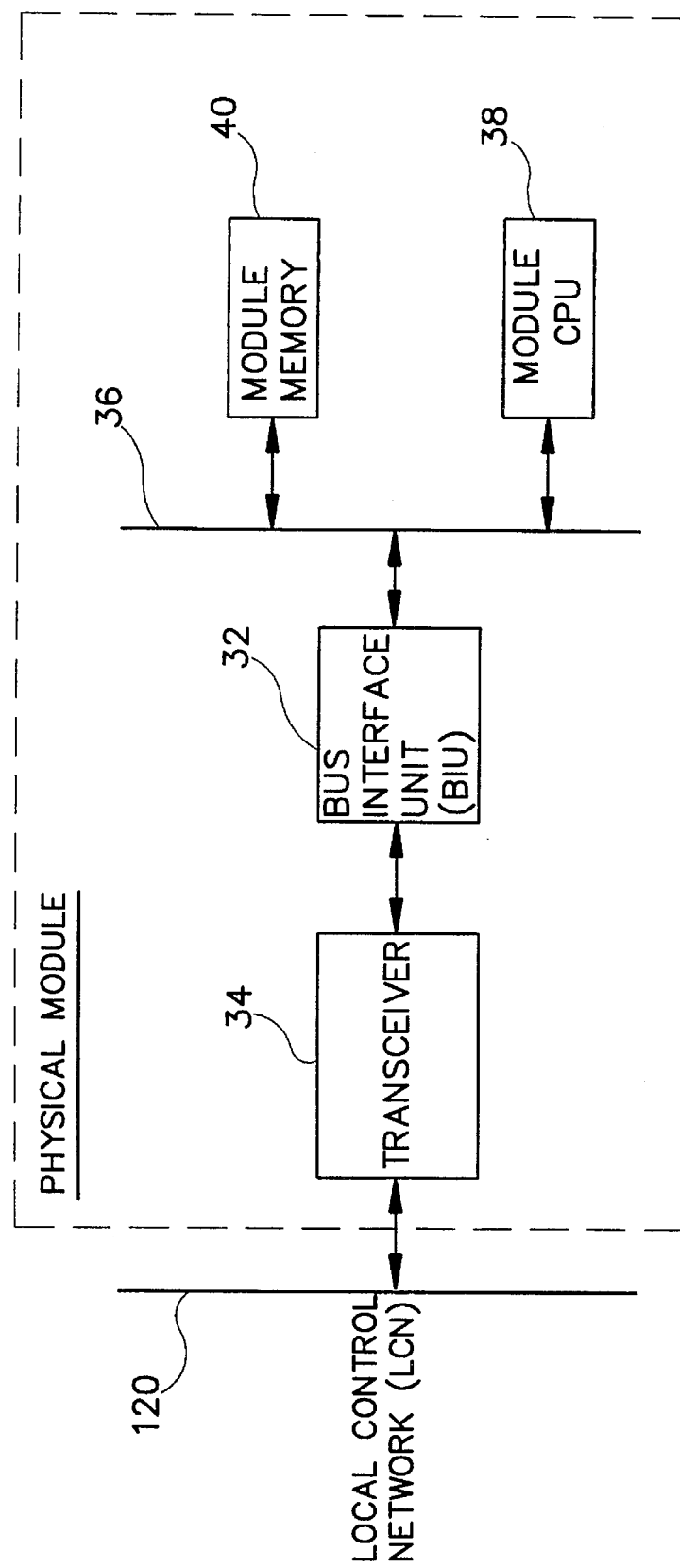
FIG. 2 is a block diagram depicting the typical elements of the many physical modules within a process control system.

Referring to FIG. 2, there is shown a block diagram of the common elements of each physical module of the network 11 or the process control system 10. Each of the physical modules includes a module central processor unit 38 and a module memory 40, a random-access memory (not shown), and such additional controller devices, or units (not shown), which are configured to provide the desired functionality of that type of module, i.e., that of the operator station 122, for nonvolatile storage capability for binary data. The types of data stored by such a mass storage device are typically trend histories, event histories, ...or data from which such histories can be determined, data that constitutes or forms CRT type displays, copies of programs for the physical modules.

Figure 3:
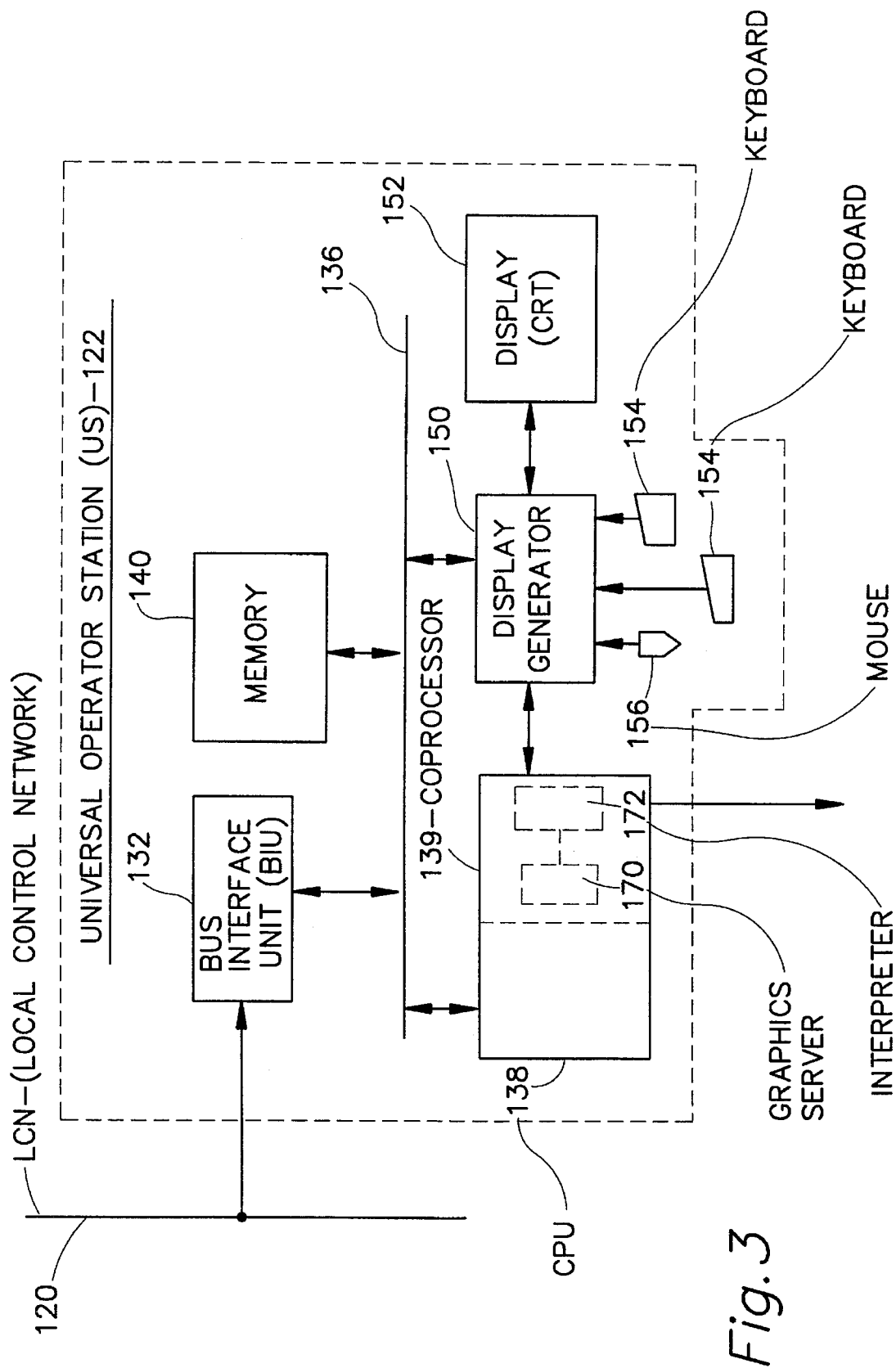
FIG. 3 is a block diagram showing the different parts of the universal station including the display system.

Referring now to FIG. 3, there is shown a block diagram of the universal station 122. Universal station 122 contains a bus interface unit 132, a memory unit 140, an internal bus 136, a CPU 138 which contains a coprocessor 139, a display generator 150 and a display or cathode ray tube (CRT) 152. Local control network 120 is connected to bus interface unit 132 which is operatively connected to the universal station internal bus 136. Memory 140, CPU 138 and display generator 150 are also connected to internal bus 136.

As previously mentioned CPU 138 has an attached coprocessor 139. A direct connection exist between coprocessor 139 and display generator 150. Coprocessor 139 also has a connection outside of the universal station which could be attached to other networks or other computer systems. (e.g., a VAX computer system manufactured by Digital Electronics Corp., or an IBM computer system manufactured by International Business Machines, Inc.) This connection between coprocessor 139 and other computer systems provides the desired open architecture for the plant control network 11 which shall be discussed in further detail. Attached to display generator 150 are numerous input devices such as a keyboard 154 and a pointing device 156. In the preferred embodiment the pointing device is either a mouse or a touch screen.

Communication between process control system 10 and separate stand-alone computer systems can provide many benefits and desired features. One feature is the ability to import different displays from remote computer systems onto process control system 10. This allows for further processing and communication capabilities.

Coprocessor 139 provides universal station 122 with the ability to communicate with remote computer systems. In the preferred embodiment, coprocessor 139 is a Motorola 68040 microprocessor running the UNIX operating system (UNIX is an operating system of the American Telephone and Telegraph Company, AT&T, and is readily available and well known to those in the art). Coprocessor 139 is sometimes referred to as a UNIX coprocessor.

Coprocessor 139 provides the windowing capabilities for Universal station 122. Coprocessor 139 runs the X-Windows windowing system. (X-Windows is a hierarchical windowing system allowing high speed graphics, which was developed by the Massachusetts Institute of Technology, Cambridge, Mass. and is well known to those skilled in the art.) Coprocessor 139 and X-Windows further accommodates communication between the coprocessor 139, and other computer systems. Generally, X-windows can allow displays to be exported from itself to remote computer systems. Similarly, displays from remote computer systems may also be imported to the universal station 122 via a coprocessor 139.

Display generator 150 is connected to the local control network 120 via internal bus 136 and bus interface unit 132. Display generator 150 is also directly connected to coprocessor 139. These two connections to display generator 150 allow for display 152 to project images from either local control network 120 or coprocessor 139.

Coprocessor 139, running the windows system, controls display 152 through display generator 150. Windowing commands are sent to display generator 150 by coprocessor 139 which causes windows to be generated on display 152. All control of these windows is done by the windowing system running on coprocessor 139.

As previously mentioned local control network 120 is also directly connected to display generator 150. This direct connection allows local control network 120 to display information on display 152. (This display of information is referred to as the LCN display.) However, also as mentioned coprocessor 139 controls display 152 via display generator 150. This control of display 152 includes controlling how and when the LCN display will be shown on display 152.

For the LCN display to be projected onto display 152, coprocessor 139 must first open a window in which the LCN display will be projected. Then coprocessor 139 must communicate to display generator 150 allowing the LCN 120 to overwrite information in the newly opened window (the LCN window).

Figure 4:
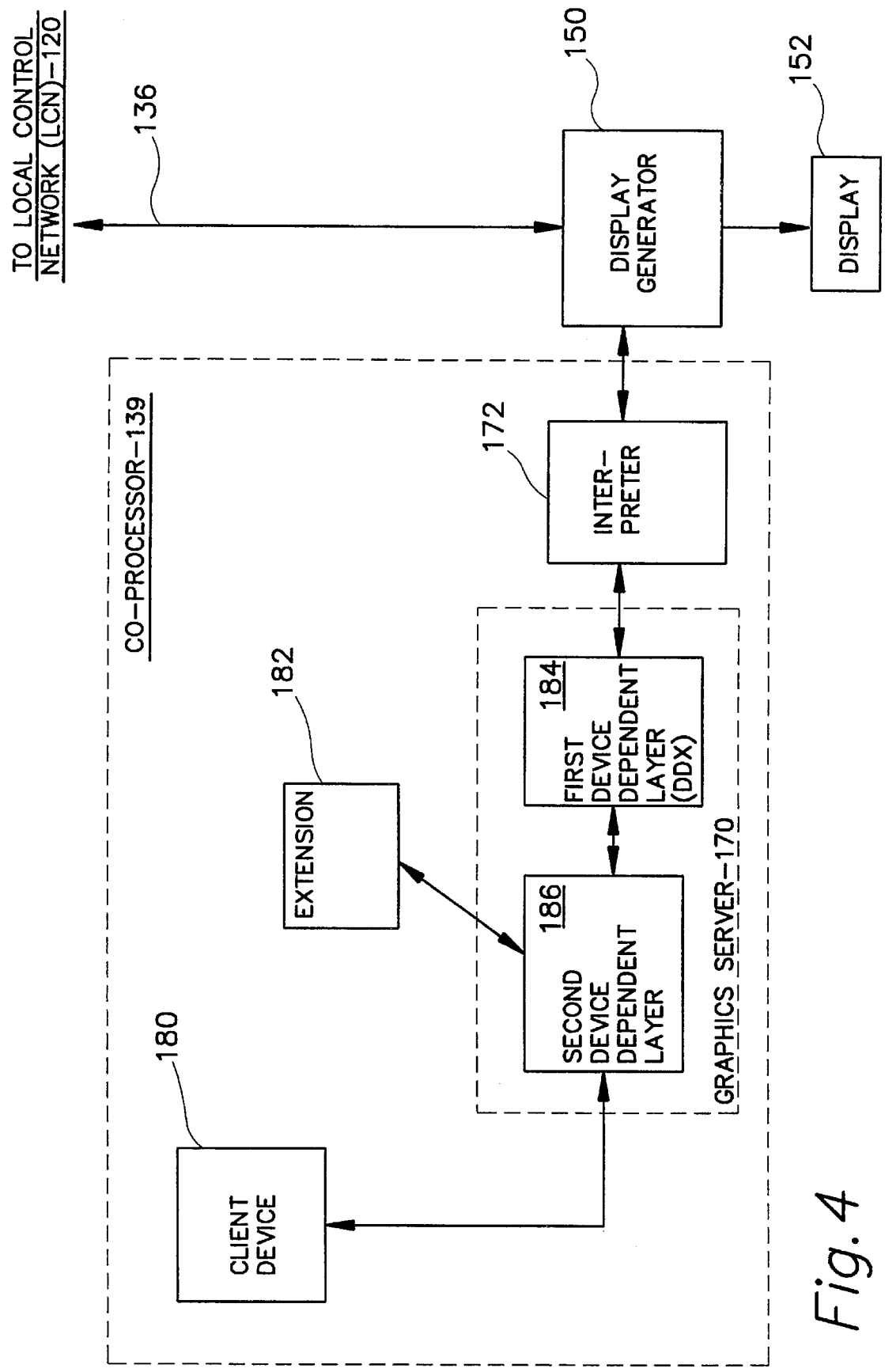
FIG. 4 is a functional block diagram illustrating how the windowing system operates to open, close and maintain windows on a display.

Referring now to FIG. 4, to open a window, coprocessor 139 must first determine the position of the window, the size of the window and the offset to be used. Within coprocessor 139 is a client or logic device 180 which calls for the LCN window to be opened. Client 180 communicates its desire to open an LCN window to a graphics server 170 (graphics server 170 is a functional block of the windowing system). Graphics server 170 then communicates the desire to open an LCN window to an extension or second logic device 182, which then determines the position, size, and offset of the LCN window. Second logic device 182 communicates the position, size, and offset back to graphics server 170. Graphics server 170 is now ready to transmit the newly obtained information to display generator 150.

In the preferred embodiment, display generator 150 and graphics server 170 are not totally compatible with one another, therefore special considerations were made to allow for communication between these two devices. Within graphics server 170 are several layers of operating instructions. Included in these layers are a first device dependent layer 184 and several higher layers (second device dependent layer) 186. Device dependent layer 184 adjusts communication so as to allow display generator 150 to understand any communication sent to it by graphics server 170. An interpreter 172 further aids the communication between graphics server 170 and display generator 150.

Graphics server 170, through first device dependent layer 184 and interpreter 172 now communicates the information regarding the LCN window to display generator 150. This exchange causes the LCN window to be opened on display 152. Once the LCN window is open, coprocessor 139 and more specifically, graphics server 170 sends commands to display generator 150 which allows LCN 120 to overwrite into the newly opened LCN window. The information overwritten comes entirely from LCN 120 and not coprocessor 139.

Once display of the LCN window has been established, coprocessor 139, in conjunction with the windowing system, provides the ability for that window to be moved, to be re-sized or to be zoomed in upon. However, the contents of the LCN window are controlled by local control network 120.

Graphics server 170 running within coprocessor 139 also controls the rest of the screen space outside of the LCN window. Therefore, coprocessor 139 in conjunction with the windowing system allows other windows to exist simultaneously with the LCN window. Furthermore, graphics server 170 running within coprocessor 139 keeps the area around the LCN window clean if nothing else is displayed there.

The LCN window is used to display crucial operating information to process control operators. Local control network 120, in conjunction with display generator 150, is capable of providing an LCN display to display 152 without the assistance of coprocessor 139. Should coprocessor 139 or the windowing system fail for any reason, the display generator allows the LCN display to be projected onto all of the screen space of display 152. This is a "fall back" mode which ensures the LCN display will not be lost. Furthermore, when coprocessor 139 opens a window for the LCN display, the contents of that window are controlled entirely by local control network 120 and display generator 150. By allowing local control network 120 to display information on display 152 when coprocessor 139 should fail insures that crucial systems information is properly communicated to a display. Furthermore, should interpreter 172 or any other portion of the windowing system fail, display generator 150 will also go into this "fall back" mode, allowing the LCN display to be projected into all the screen space of display 152.

The present invention has been described in considerable detail. Those skilled in the art will understand that certain modifications and changes can be made to the present invention without departing from the scope and spirit of the present invention as claimed in the attached claims.

What is claimed is:

1. In a process control system having a plurality of physical modules, each physical module being operatively connected to a local control network (LCN) bus, communication via the LCN bus being in accordance with a proprietary protocol, each physical module performing a predetermined function, and each physical module being equivalent of each of the other physical modules in terms of right of access to the LCN bus for purposes of transmitting data to each of the other physical modules, one of said physical modules being an operator station module for providing an interface between an operator and the process control system, the operator station module including a display system for the process control system, and further wherein the operator station module provides an interface between the process control system and a remote computer system thereby permitting the remote computer system to display information on the display system of the process control system, the display system comprising:

a) a display generator having at least one first input port, a first output port, a first communication port connected to a module bus of the operator station module, the module bus being operatively connected to the LCN bus of the process control system, and a second communication port;

b) at least one input device, each input device being connected to a corresponding number of first input ports of the display generator, for communicating information from a user to the display generator;

c) a display device connected to the first output port of the display generator for displaying information provided by the display generator;

d) a module central process unit (CPU), connected to the module bus, for processing control and display data from the process control system, the module CPU providing a communication link to the process control system via the proprietary protocol thereby maintaining security and integrity of the process control system;

e) a coprocessor, having a graphics server logic, the coprocessor connected to the module CPU for receiving control and display data from the process control system, the coprocessor further having a port adapted to receive control and display data from the remote computer system, the coprocessor further connected to the second communication part of the display generator, the coprocessor controlling the display of data on the display device, the data being displayed being from the process control system and the remote computer system in response to the control data received by the coprocessor, the data being displayed in a windows format, wherein the display generator cases the data received form the LCN bus of the process control system to be displayed on the display device whenever the graphics server logic fails.

2. The display system according to claim 1, wherein said coprocessor further comprises:

a) graphics server logic, for providing control to the display generator such that data transmitted to the display generator from the LCN bus of the process control system is displayed in a first area of the display device, and data transmitted to the display generator from the graphics server is simultaneously displayed in a second area of the display device; and b) interpreter logic, coupled to said graphics server logic for assisting in the communication between the graphics server logic and the display generator.

3. The display system according to claim 2 wherein the display generator receives information from at least one input device and transmits the information in a translated form to the graphics server logic.

4. The display system according to claim 3, wherein the graphics server logic is operating X-Windows to allow windowing of the display device.

* * * * *